(12) United States Patent
Taylor et al.

(10) Patent No.: US 12,435,780 B1
(45) Date of Patent: Oct. 7, 2025

(54) ACTUATOR FOR GENERATING A COMBINATION OF AN AXIAL AND AN OSCILLATING MOVEMENT

(71) Applicant: Maxon International AG, Sachseln (CH)

(72) Inventors: Justin Taylor, Lakeville, MA (US); David Mello, Swansea, MA (US); Christopher Blake, Taunton, MA (US)

(73) Assignee: Maxon International AG, Sachseln (CH)

( * ) Notice: Subject to any disclaimer, the term of this patent is extended or adjusted under 35 U.S.C. 154(b) by 0 days.

(21) Appl. No.: 18/669,911

(22) Filed: May 21, 2024

(51) Int. Cl.
*F16H 37/12* (2006.01)

(52) U.S. Cl.
CPC .................... *F16H 37/124* (2013.01)

(58) Field of Classification Search
CPC .... F16H 25/20; F16H 25/2018; F16H 25/186; F16H 25/02; F16H 37/124
USPC ......................................................... 74/89.23
See application file for complete search history.

(56) References Cited

U.S. PATENT DOCUMENTS

2002/0162410 A1* 11/2002 Zimmerman ............ A47B 9/04
74/89.35

FOREIGN PATENT DOCUMENTS

DE 102004059844 A1 * 7/2006 ............. F16H 25/20
KR 20140033602 A * 9/2012 ............. B61D 23/02

* cited by examiner

*Primary Examiner* — T. Scott Fix
(74) *Attorney, Agent, or Firm* — Dickinson Wright PLLC

(57) ABSTRACT

The actuator has a spindle drive comprising a threaded shaft and a spindle nut. The spindle nut is rotatably actuatable to generate a main axial movement of the threaded shaft along an axis of the threaded shaft. The actuator comprises an oscillating device and the spindle nut is movably arranged along the axis. The oscillating device introduces an oscillating movement along the axis onto the spindle nut and thereby onto the threaded shaft. A total axial movement of the threaded shaft is generated that is the combination of the main axial movement and the oscillating movement.

20 Claims, 3 Drawing Sheets

ACTUATOR FOR GENERATING A COMBINATION OF AN AXIAL AND AN OSCILLATING MOVEMENT

BACKGROUND

A known actuator comprises a spindle drive comprising a threaded shaft and a spindle nut, wherein the spindle nut is rotatably actuatable to generate an axial movement of the threaded shaft along an axis of the threaded shaft.

The movement profile of the threaded shaft along the axis is determined by an axial displacement of the threaded shaft that is generated by the rotation of the spindle nut in regard to the threaded shaft and is limited to this movement profile.

SUMMARY

The object of the disclosure is to enable a different more diverse movement profile of the threaded shaft.

The object is solved by an actuator that comprises a spindle drive with a threaded shaft and a spindle nut. The spindle nut is rotatably actuatable to generate a main axial movement of the threaded shaft along an axis of the threaded shaft. The actuator comprises an oscillating device and the spindle nut is movably arranged along the axis, such that the oscillating device introduces an oscillating movement along the axis onto the spindle nut and thereby onto the threaded shaft. A total axial movement of the threaded shaft is generated that is the combination of the main axial movement and the oscillating movement.

The actuator according to the subject disclosure enables a different more diverse movement profile of the threaded shaft in an efficient manner.

In an embodiment, the axial displacements of the threaded shaft generated by the main axial movement and by the oscillating movement are configured such that a direction of the total axial movement equals a direction of the main axial movement. For this, the axial displacement of the threaded shaft generated by the oscillating movement in an opposite direction to the direction of the main axial movement is smaller than the axial displacements of the threaded shaft generated by the main axial movement.

In another embodiment, the spindle nut is rotatably actuatable by an electric drive unit that drives a drive shaft that is coupled to the spindle nut by a traction means. The electric drive unit can induce a precise rotational movement of the spindle nut. By using a traction means for coupling the drive shaft of the electric drive unit to the spindle nut, an axial displacement of the spindle nut can be accommodated for.

Further, the electric drive unit can comprise an electric motor and a gear unit to drive the drive shaft. Thereby certain torques and rotational speeds of the rotational movement of the spindle nut can be achieved. The gear unit can comprise among others preferably planetary, spur or angular gears.

Further, the traction means can be a chain. The chain as the traction means can transfer high torques and is relatively accommodating of the oscillating movement of the spindle nut along the axis. A first gearing can be torsion resistantly fixed to the spindle nut and a second gearing can be torsion resistantly fixed to the drive shaft, wherein the chain engages with the first gearing and the second gearing.

Besides, the drive shaft and the threaded shaft can be arranged in parallel to each other. This ensures an efficient power transmission from the drive shaft to the threaded shaft.

In an embodiment, the oscillating device is configured such that a rotation of the spindle nut causes the oscillating device to introduce the oscillating movement along the axis onto the spindle nut. As a result, the actuator only requires one drive source in order to generate the main axial movement and the oscillating movement.

Therefore, the oscillating device can comprise a first ripple plate with a first ripple profile and a counterpart. Either the first ripple plate is either torsion resistantly coupled or formed integrally with the spindle nut and the counterpart is torsion resistantly coupled to a casing part of the actuator in a fixed position along the axis or the counter part is either torsion resistantly coupled or formed integrally with the spindle nut and the first ripple plate is torsion resistantly coupled to the casing part of the actuator in the fixed position along the axis. The first ripple plate and the counterpart contact each other in a direction along the axis and move along each other due to the rotation of the spindle nut relative to the casing part, whereby the oscillating movement along the axis is introduced onto the spindle nut. Thereby, the oscillating movement can be generated in an efficient and robust way.

The first ripple plate can be one integral component or it can consist of several components. Here, the first ripple plate can be formed in a number of ways. However, the first ripple profile must be arranged around the axis and must have at least one height and at least one depth in the direction along the axis, so that the counterpart interacts with the ripple profile in such a way that the oscillating movement of the spindle nut is generated by its connection to the first ripple plate or counterpart. A wave-shaped profile can be placed around the axis to form the height and depth. However, there can also be a single protrusion in the direction along the axis at one end of the spindle nut that interacts with the counterpart to create the height and depth.

Further, in an embodiment, the actuator comprises a preloading device that elastically presses the spindle nut with the first ripple plate or counterpart onto the counterpart or first ripple plate in the direction along the axis. This ensures the contact between the first ripple plate and the counterpart and therefor the generation of the oscillating movement. The first ripple plate or counterpart can be coupled to one axial end of the spindle nut and the preloading device can be a pressing device that elastically presses onto the other axial end of the spindle nut.

Besides, the first ripple profile can be point-symmetrical to a point on the axis. This results in an even force transmission from the ripple plate onto the counterpart on opposite sides of the axis and therefore a more uniform movement of the spindle nut along the axis.

The counterpart can be a second ripple plate with a second ripple profile. Thereby the second ripple profile can be point-symmetrical to a second point on the axis.

The first ripple profile and the second ripple profile can be the same or be inverted.

The counterpart can also be several rotatable supported cylinders or balls that are in contact with the first ripple plate.

In an embodiment, the first ripple plate and/or the counterpart are made of ceramic. Preferably, one of the ripple plates is made of ceramic and one of steel. As a result, wear can be kept to a minimum despite high friction between the first ripple plate and the counterpart.

For this, the ceramic can be zirconium oxide $ZrO2$ or aluminium oxide $Al2O3$. These have suitable properties.

Further, the first ripple plate and/or the counterpart can be made by ceramic injection molding. This allows for cost-effective production.

Surfaces of the first ripple plate and/or the counterpart that are in contact with each other can be smoothed after the ceramic injection molding. Hereby, friction between the first ripple plate and the counterpart can be lessened.

In an embodiment, the oscillating movement is a sinusoidal movement along the axis, wherein the sinusoidal movement has a constant amplitude or several amplitudes. Here, the sinusoidal movement can have a frequency between 1 to 10 Hz, preferably between 2 to 5 Hz. Further, an average force that is generated along the axis by the total axial movement of the threaded shaft can be 5 to 10 kN, preferably 7 to 9 kN. Besides, an applied force that is generated along the axis by the total axial movement of the threaded shaft can oscillate around the average force due to the oscillating movement by +/−2 kN, preferably by +/−1 kN. In this embodiment, the first and/or second ripple plates are preferably designed such that the ripple plate has a sinusoidal wave profile when viewed in the circumferential direction.

In an embodiment the maximal gradient of the sinusoidal wave profile of a ripple plate has an angle smaller or equal 45°, preferably smaller or equal 25°. Higher gradients generate more acoustic noise, and more torque is needed. Shallow sinusoidal wave profiles with flat angles in combination with increasing the rotational speed allows equivalent frequencies of the sinusoidal movement with lower torque and noise.

In an alternative embodiment, the first and/or second ripple plates are preferably designed such that the ripple plate has a sawtooth profile. Such a profile can generate a sharp drop in the applied force.

In a further embodiment, an additional oscillating device is positioned on the opposite side of the spindle nut to the oscillating device. The additional oscillating can comprise an additional set of ripple plates. This additional set of ripple plates can have the same profiles then the first and second ripple plate of the oscillating device. This enables the actuator to provide the same oscillating motion of the threaded shaft when it is moved in the opposite axial direction.

In a further aspect, the present disclosure provides an actuator with a spindle drive comprising a threaded shaft and a spindle nut, wherein the spindle nut is rotatably actuatable to generate a main axial movement of the threaded shaft along an axis of the threaded shaft, wherein the spindle nut is movably arranged along the axis and the actuator comprises a first ripple plate with a first ripple profile and a second ripple plate with a second ripple profile, wherein the first ripple plate is either torsion resistantly coupled or formed integrally with the spindle nut and the second ripple plate is torsion resistantly coupled to a casing part of the actuator in a fixed position along the axis, such that the first ripple plate and the second ripple plate contact each other in a direction along the axis and move along each other due to a rotation of the spindle nut relative to the casing part, such that an oscillating movement along the axis is introduced onto the spindle nut and thereby onto the threaded shaft, whereby a total axial movement of the threaded shaft is generated that is the combination of the main axial movement and the oscillating movement, wherein the first ripple plate and/or the second ripple plate are made of ceramic.

The threaded shaft of the actuator can be coupled to a plunger to generate a particular suitable movement of the plunger along the axis through a movement of the threaded shaft along the axis. The plunger can be arranged torsion resistantly fixed relative to the spindle nut to generate the axial movement of the threaded shaft.

BRIEF DESCRIPTION OF THE DRAWINGS

These and other features and advantages of the present disclosure will become more readily appreciated when considered in connection with the following description of the presently preferred embodiments, appended claims and accompanying drawings, in which:

DETAILED DESCRIPTION OF THE ENABLING EMBODIMENT

In the following Figures, identical parts are identified by the same reference signs. Insofar as a Figure contains reference signs which are not explicitly referred to in the associated Figure description, reference is made to preceding or subsequent Figure descriptions.

Figure 1:
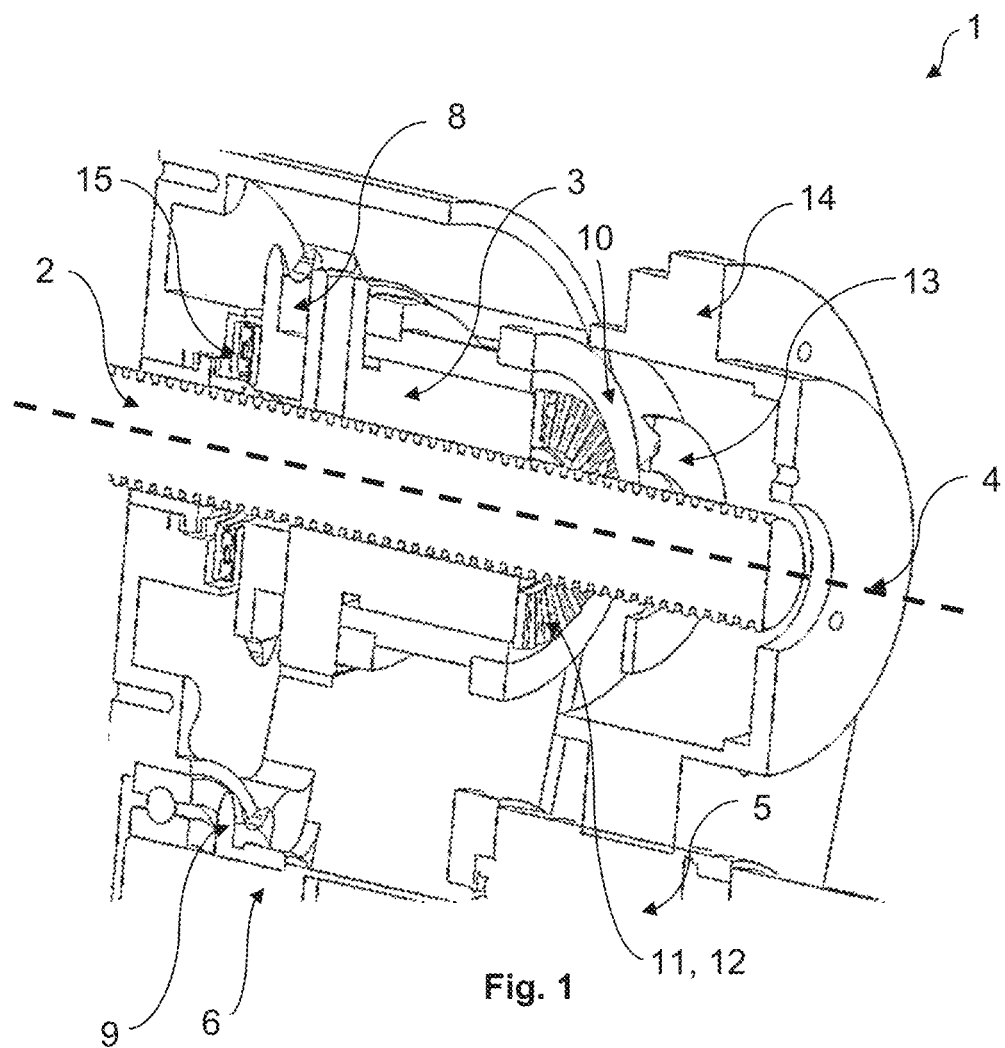
FIG. 1: an angled view of an axial section through an exploded view of a part of a first embodiment of an actuator according to the present disclosure.

FIG. 1 shows a first embodiment of an actuator 1 according to the present disclosure. The actuator 1 comprises a spindle drive with a threaded shaft 2 and a spindle nut 3, wherein the spindle nut 3 is rotatably actuatable to generate a main axial movement of the threaded shaft 2 along an axis 4 of the threaded shaft 2. To rotate the spindle nut 3, the actuator 1 comprises an electric drive unit with an electric motor 5 that drives a drive shaft 6 that is coupled to the spindle nut 3 by a chain 7 as a traction means, wherein the chain 7 is not shown in FIG. 1. For this, a first gearing 8 is torsion resistantly fixed to the spindle nut 3 and a second gearing 9 is torsion resistantly fixed to the drive shaft 6, wherein the chain 7 engages with the first gearing 8 and the second gearing 9. The threaded shaft 2 and the drive shaft 6 are arranged in parallel.

Further, the actuator 1 comprises an oscillating device 10 and the spindle nut 3 is movably arranged along the axis 4, such that the oscillating device 10 introduces an oscillating movement along the axis 4 onto the spindle nut 3 and thereby onto the threaded shaft 2. This results in a total axial movement of the threaded shaft 2 that is the combination of the main axial movement and the oscillating movement. Here, a direction of the total axial movement is always the same as a direction of the main axial movement. Accordingly, a speed of the main axial movement along the axis 4 exceeds a maximal absolute value of a speed of the oscillating movement along the axis 4.

For this, the oscillating device 10 comprises a first ripple plate 11 with a first ripple profile 12 that is torsion resistantly coupled to an axial end of the spindle nut and a counterpart 13, which is torsion resistantly coupled to a casing part 14 of the actuator 1 in a fixed position along the axis 4. In the shown first embodiment in FIG. 1, the counterpart 13 is a second ripple plate with a second ripple profile. The first ripple plate 11 and the counterpart 13 contact each other in a direction along the axis 4 and move along each other due to the rotation of the spindle nut 3 relative to the casing part 14, whereby the oscillating movement along the axis 4 is introduced onto the spindle nut 3.

To ensure the contact between the first ripple plate 11 and the counterpart 13, the actuator 1 according to the first embodiment comprises a preloading device 15 that elastically presses the spindle nut 3 with the first ripple plate 11 onto the counterpart 13 in the direction along the axis 4. Therefore, the preloading device 15 is arranged at an opposite axial end of the spindle nut than the first ripple plate 11.

The first ripple profile 11 and the second ripple profile of the first embodiment of the actuator 1 are point-symmetrical to points on the axis 4, wherein the first ripple profile 11 and the second ripple profile are the same.

Figure 2:
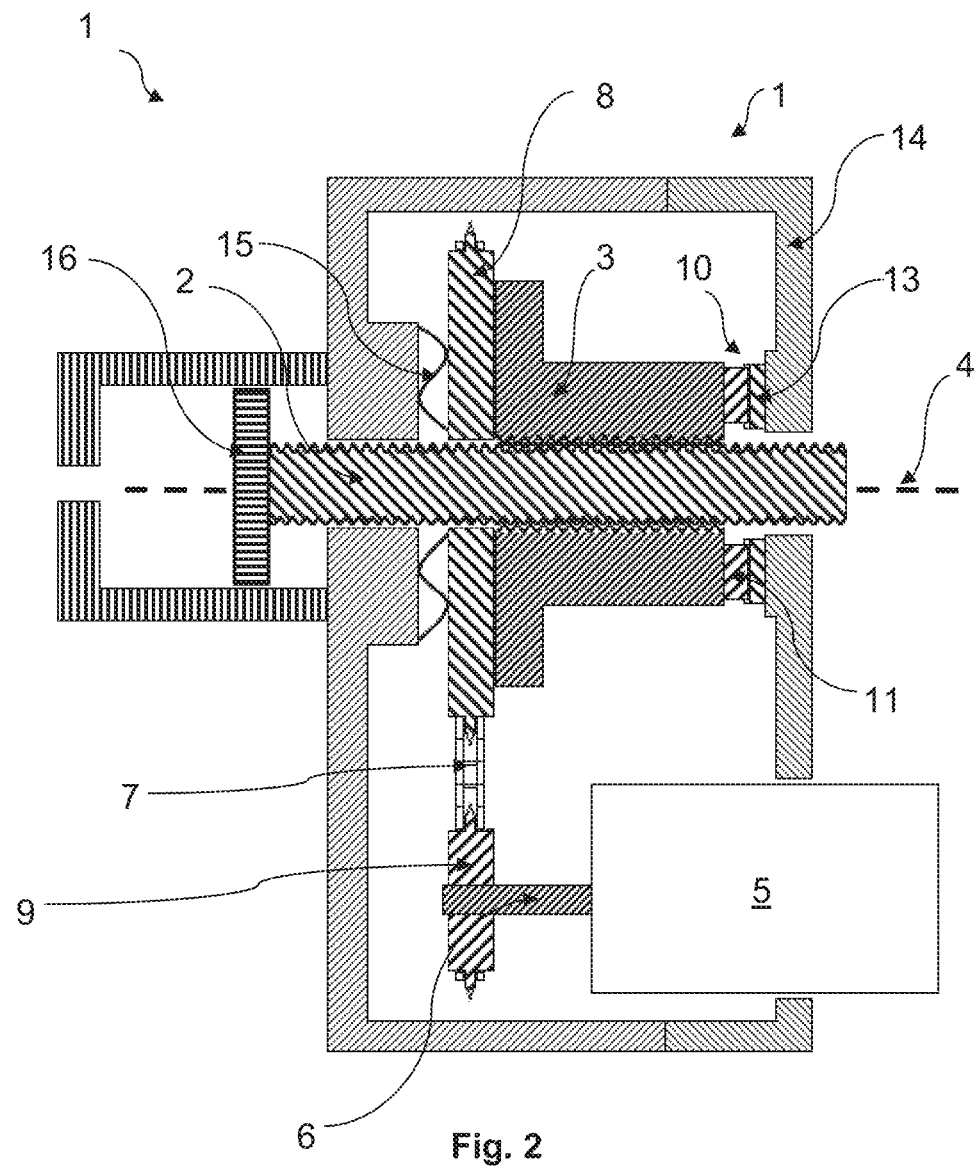
FIG. 2: an axial section through a schematic second embodiment of an actuator according to the present disclosure.

FIG. 2 shows an axial section through a schematic second embodiment of an actuator 1 according to the present disclosure. The second embodiment has basically the same general structure as the first embodiment shown in FIG. 1. In contrast to the embodiment in FIG. 1, however, FIG. 2 shows how the threaded shaft 3 is coupled to a plunger 16. The plunger can be arranged torsion resistantly fixed relative to the spindle nut to generate the axial movement of the threaded shaft.

Figure 3:
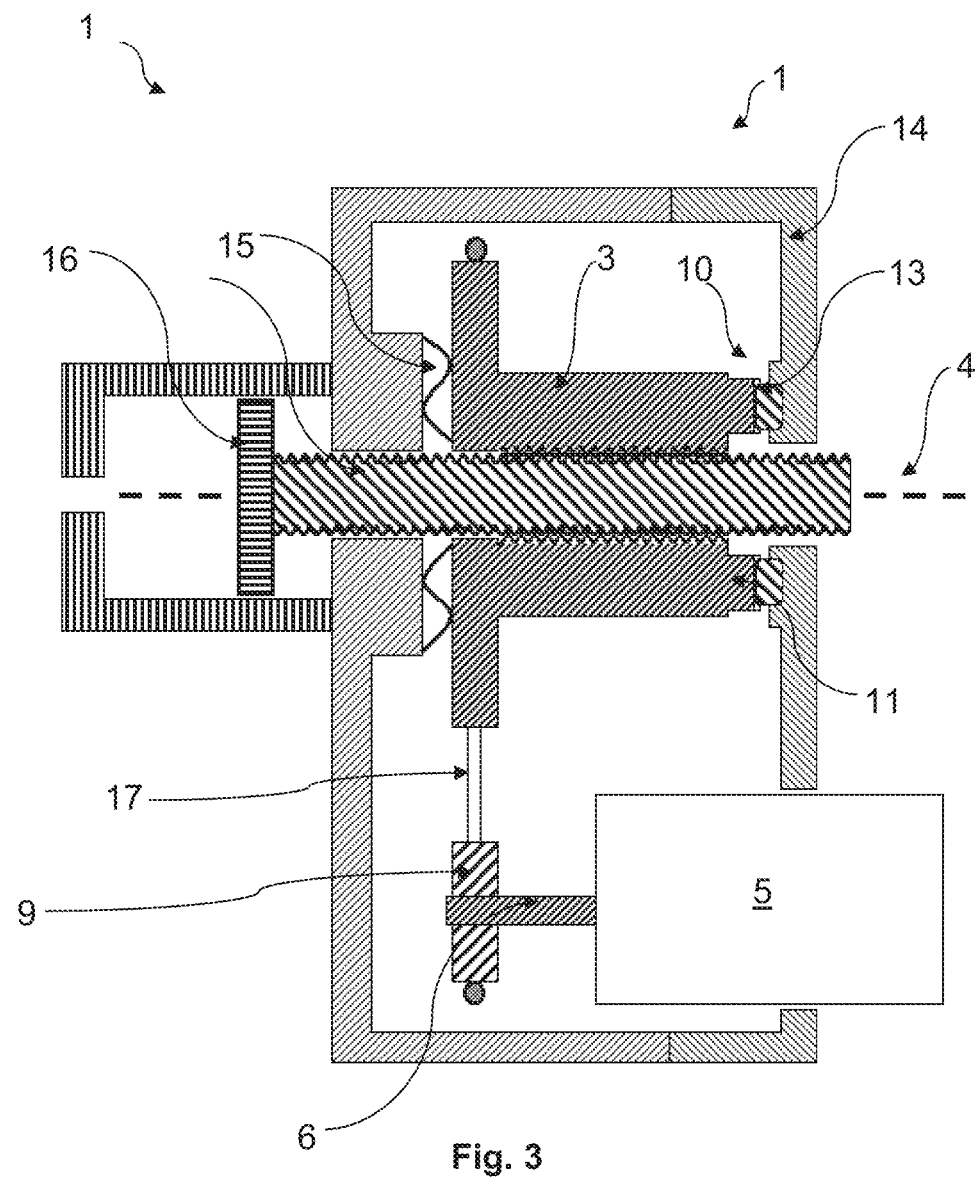
FIG. 3: an axial section through a schematic third embodiment of an actuator according to the present disclosure.

FIG. 3 shows an axial section through a schematic third embodiment of an actuator 1 according to the present disclosure. In contrast to the first and second embodiments, the traction means is configured as a belt 18, wherein the spindle nut 3 itself comprises a guide for the belt. Further, the first ripple plate 11 is configured as an integral part of the spindle nut 3 and the counterpart 13 is configured as several cylinders, which are rotatably mounted onto the casing part 14.

Obviously, many modifications and variations of the present disclosure are possible in light of the above teachings and may be practiced otherwise than as specifically described while within the scope of the appended claims. Additionally, it is to be understood that all features of all claims and all embodiments can be combined with each other as long as they do not contradict each other.

LIST OF REFERENCE SIGNS 1 actuator
2 threaded shaft
3 spindle nut
4 axis
5 electric motor
6 drive shaft
7 chain
8 first gearing
9 second gearing
10 oscillating device
11 first ripple plate
12 first ripple profile
13 counterpart
14 casing part
15 preloading device
16 plunger
17 belt

What is claimed is:

1. An actuator with a spindle drive comprising a threaded shaft and a spindle nut, wherein the spindle nut is rotatably actuatable to generate a main axial movement of the threaded shaft along an axis of the threaded shaft, wherein the actuator comprises an oscillating device and the spindle nut is movably arranged along the axis, such that the oscillating device introduces an oscillating movement along the axis onto the spindle nut and thereby onto the threaded shaft, whereby a total axial movement of the threaded shaft is generated that is the combination of the main axial movement and the oscillating movement, wherein the spindle nut is rotatably actuatable by an electric drive unit that drives a drive shaft that is coupled to the spindle nut by a traction means.

2. The actuator of claim 1, wherein axial displacements of the threaded shaft generated by the main axial movement and by the oscillating movement are configured such that a direction of the total axial movement equals a direction of the main axial movement.

3. The actuator of claim 1, wherein the traction means is a chain.

4. The actuator of claim 1, wherein the drive shaft and the threaded shaft are arranged in parallel to each other.

5. The actuator of claim 1, wherein the oscillating device is configured such that a rotation of the spindle nut causes the oscillating device to introduce the oscillating movement along the axis onto the spindle nut.

6. The actuator of claim 1, wherein the oscillating movement is a sinusoidal movement along the axis, wherein the sinusoidal movement has a constant amplitude or several amplitudes.

7. The actuator of claim 6, wherein the sinusoidal movement has a frequency between 1 to 10 Hz.

8. The actuator of claim 6, wherein the sinusoidal movement has a frequency between 2 to 5 Hz.

9. The actuator of claim 1, wherein an average force that is generated along the axis by the total axial movement of the threaded shaft is 5 to 10 kN.

10. The actuator of claim 9, wherein an applied force that is generated along the axis by the total axial movement of the threaded shaft oscillates around the average force by +/−2 kN.

11. An actuator with a spindle drive comprising a threaded shaft and a spindle nut, wherein the spindle nut is rotatably actuatable to generate a main axial movement of the threaded shaft along an axis of the threaded shaft, wherein the actuator comprises an oscillating device and the spindle nut is movably arranged along the axis, such that the oscillating device introduces an oscillating movement along the axis onto the spindle nut and thereby onto the threaded shaft, whereby a total axial movement of the threaded shaft is generated that is the combination of the main axial movement and the oscillating movement, wherein the oscillating device is configured such that a rotation of the spindle nut causes the oscillating device to introduce the oscillating movement along the axis onto the spindle nut,
wherein the oscillating device comprises a first ripple plate with a first ripple profile and a counterpart,
wherein either the first ripple plate is either torsion resistantly coupled or formed integrally with the spindle nut and the counterpart is torsion resistantly coupled to a casing part of the actuator in a fixed position along the axis
or the counter part is either torsion resistantly coupled or formed integrally with the spindle nut and the first ripple plate is torsion resistantly coupled to the casing part of the actuator in the fixed position along the axis,
such that the first ripple plate and the counterpart contact each other in a direction along the axis and move along each other due to the rotation of the spindle nut relative to the casing part, whereby the oscillating movement along the axis is introduced onto the spindle nut.

12. The actuator of claim 11, wherein the actuator comprises a preloading device that elastically presses the spindle nut with the first ripple plate or counterpart onto the counterpart or first ripple plate in the direction along the axis.

13. The actuator of claim 11, wherein the first ripple profile is point-symmetrical to a point on the axis.

14. The actuator of claim 11, wherein the counterpart is a second ripple plate with a second ripple profile.

15. The actuator of claim 14, wherein the first ripple profile and the second ripple profile are the same.

16. The actuator of claim 11, wherein the first ripple plate and/or the counterpart are made of ceramic.

17. The actuator of claim 16, wherein the ceramic is zirconium oxide ZrO2 or aluminium oxide Al2O3.

18. The actuator of claim 16, wherein the first ripple plate and/or the counterpart are made by ceramic injection molding.

19. The actuator of claim 18, wherein surfaces of the first ripple plate and/or the counterpart that are in contact with each other are smoothed after the ceramic injection molding.

20. An actuator with a spindle drive comprising a threaded shaft and a spindle nut, wherein the spindle nut is rotatably actuatable to generate a main axial movement of the threaded shaft along an axis of the threaded shaft, wherein the spindle nut is movably arranged along the axis and the actuator comprises a first ripple plate with a first ripple profile and a second ripple plate with a second ripple profile, wherein the first ripple plate is either torsion resistantly coupled or formed integrally with the spindle nut and the second ripple plate is torsion resistantly coupled to a casing part of the actuator in a fixed position along the axis, such that the first ripple plate and the second ripple plate contact each other in a direction along the axis and move along each other due to a rotation of the spindle nut relative to the casing part, such that an oscillating movement along the axis is introduced onto the spindle nut and thereby onto the threaded shaft, whereby a total axial movement of the threaded shaft is generated that is the combination of the main axial movement and the oscillating movement, wherein the first ripple plate and/or the second ripple plate are made of ceramic.

* * * * *